US012476413B2

(12) United States Patent
Niepalla et al.

(10) Patent No.: US 12,476,413 B2
(45) Date of Patent: Nov. 18, 2025

(54) HOUSING COMPONENT FOR A PLUG CONNECTOR, PLUG CONNECTOR, AND PLUG CONNECTOR ASSEMBLY

(71) Applicant: Rosenberger Hochfrequenztechnik GmbH & Co. KG, Fridolfing (DE)

(72) Inventors: Tomasz Niepalla, Tacherting (DE); Martin Auer, Tyrlaching (DE); Andreas Beicht, Burghausen (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 532 days.

(21) Appl. No.: 17/969,930

(22) Filed: Oct. 20, 2022

(65) Prior Publication Data

US 2023/0131123 A1 Apr. 27, 2023

(30) Foreign Application Priority Data

Oct. 27, 2021 (EP) .................................... 21204927

(51) Int. Cl.
*H01R 13/52* (2006.01)
*H01R 13/502* (2006.01)

(52) U.S. Cl.
CPC ....... *H01R 13/5205* (2013.01); *H01R 13/502* (2013.01); *H01R 13/5213* (2013.01); *H01R 13/5227* (2013.01); *H01R 2201/26* (2013.01)

(58) Field of Classification Search
CPC .............. H01R 13/5205; H01R 13/502; H01R 13/5213; H01R 13/5227; H01R 2201/26; H01R 13/506; H01R 13/5812; Y02T 10/70; Y02T 10/7072; Y02T 90/14
See application file for complete search history.

(56) References Cited

U.S. PATENT DOCUMENTS

| | | | | |
|---|---|---|---|---|
| 5,800,188 | A * | 9/1998 | Barber | B60D 1/64 439/651 |
| 6,247,949 | B1 | 6/2001 | Chen | |
| 2017/0149167 | A1 | 5/2017 | Ito et al. | |
| 2017/0271810 | A1 * | 9/2017 | Nguyen Nhu | H01R 24/38 |
| 2020/0076139 | A1 | 3/2020 | Lehnert et al. | |
| 2023/0131123 | A1 * | 4/2023 | Niepalla | H01R 13/5205 439/587 |

FOREIGN PATENT DOCUMENTS

| | | | |
|---|---|---|---|
| EP | 2573880 | A1 | 3/2013 |
| JP | 2017027712 | A | 2/2017 |

* cited by examiner

*Primary Examiner* — Abdullah A Riyami
*Assistant Examiner* — Nader J Alhawamdeh
(74) *Attorney, Agent, or Firm* — Dickinson Wright PLLC

(57) ABSTRACT

A housing component for a plug connector, in particular an end cap for a plug connector housing, having a cable-side axial portion and a plug-side axial portion adjoining the cable-side portion along a longitudinal axis. A cable bushing for a cable is formed in the cable-side portion and runs along the longitudinal axis. It is provided that the housing component has at least one fluid channel running in the cable bushing and being open towards the cable, in order to conduct away a fluid which has penetrated between the cable bushing and the cable in a defined manner into the plug-side portion. The fluid channel winds through the cable bushing at least in portions along the longitudinal axis. At least one outlet opening is formed in the plug-side portion in order to discharge the fluid from the housing component transversely to the longitudinal axis.

13 Claims, 2 Drawing Sheets

HOUSING COMPONENT FOR A PLUG CONNECTOR, PLUG CONNECTOR, AND PLUG CONNECTOR ASSEMBLY

CROSS REFERENCE TO RELATED APPLICATION

This US Utility Patent Application claims the benefit of and priority to European Patent Application No. 21 204 927.4 filed on Oct. 27, 2021, the entire disclosure of which is incorporated herein by reference.

TECHNICAL FIELD

The invention relates to a housing component for a plug connector, in particular an end cap for a plug connector housing, having a cable-side axial portion with a cable bushing for a cable and a plug-side axial portion, according to the preamble of claims 1, 6 and 13.

The invention additionally relates to a plug connector comprising a housing component and at least one sealing element.

The invention further relates to a plug connector assembly comprising a plug connector and a cable leading into the plug connector.

BACKGROUND OF THE INVENTION

Various optical and electrical plug connectors are known from electrical engineering. Plug connectors are known to transmit supply signals and/or data signals to corresponding mating plug connectors.

High demands are sometimes placed on the robustness and safety of plug connectors. Against this background, it is particularly important to ensure that the plug connector is adequately protected against the ingress of liquids. Plug connectors used in vehicles in particular are frequently exposed to adverse ambient conditions and are also usually a safety-critical component for the operation of the vehicle. For example, high-voltage plug connectors are used in the automotive sector in electric and/or hybrid vehicles to supply a vehicle battery with charging current or to extract the stored energy from the battery and feed it to the electric drive. The electrical plug connection must permanently and reliably prevent the ingress of moisture and contaminations and must ensure perfect transmission of high currents with preferably low transfer impedance.

In particular, the cable feed of the cable into the interior of the plug connector often represents a weak point in terms of sealing, which is why particularly high sealing requirements can apply in this region. As a rule, sealing elements applied to the cable in the region of the cable feed are used in combination with end caps. In order to achieve a sufficient sealing effect, sealing elements are sometimes used that are highly complex, costly to manufacture, and too cumbersome to install, as proposed, for example, in JP 2017-027712 A. Furthermore, the known sealing systems require a comparatively large amount of axial installation space, which is not always tolerable depending on the intended use.

SUMMARY OF THE INVENTION

In view of the known prior art, the object of the present invention is to provide a housing component for a plug connector which is capable of providing a sealing function in the cable feed of the plug connector by simple means, preferably in combination with a sealing element, and in particular with low installation space requirements.

A further object of the present invention is to provide a plug connector with a housing component which is capable of providing a sealing function in the cable feed of the plug connector by simple means, preferably in combination with a sealing element, and in particular with a low installation space requirement.

Lastly, it is also an object of the invention to provide a plug connector assembly, with a plug connector having a housing component capable of providing a sealing function in the cable feed of the plug connector by simple means, preferably in combination with a sealing element, and in particular with a low installation space requirement.

The object is achieved for the housing component with the features listed in claim 6 or claim 13. With regard to the plug connector, the object is achieved by the features of claim 11 and, in relation to the plug connector assembly, by claim 12.

The dependent claims and the features described below relate to advantageous embodiments and variants of the invention.

The invention relates to a housing component for a plug connector.

In particular, the plug connector may be an electrical plug connector. However, the invention may also be well suited for an optical plug connector. Particularly advantageously, the invention is suitable for use with an electrical plug connector for use in a vehicle, for example in a motor vehicle. Very particularly preferably, the invention is for use with a high-voltage plug connector.

The housing component can be any housing component of the plug connector, in particular a housing component of a multi-part plug connector housing, but possibly even a one-piece plug connector housing or a portion of a one-piece plug connector housing. Preferably, the housing component is formed as an end cap of a multi-part plug connector housing.

The housing component can be located at the cable-side end of the plug connector or plug connector housing.

The housing component can be in the form of a sleeve or hollow-cylindrical, annular and/or in the form of a cap, in some portions or fully.

The housing component can preferably be formed in one piece, but if necessary also in several pieces.

The housing component can be formed from a plastic and produced, for example, by means of an injection molding process. Preferred plastics are thermoplastics, thermosets and/or elastomers. However, the housing component can also be made of a metal, such as aluminum or copper, and can be produced, for example, by means of a deep-drawing process.

It may be provided that a sealing element described below directly adjoins the housing component along the longitudinal axis in the direction of the plug-side end of the plug connector, for example directly borders the housing component or is accommodated in the housing component and is preferably axially fixed. Preferably, the housing component has a receptacle and/or one or more fixing means for the sealing element.

The housing component can preferably be primarily round. In principle, however, the housing component can have any cross-sectional geometry, for example it can also be angular or oval.

The cable is preferably not to be understood as a part of the housing component, even if it is sometimes described above and below that the cable is accommodated in the cable bushing. In principle, the claimed housing component need only be technically suitable for use with a corresponding cable. If necessary, however, the cable or at least an end portion of the cable leading into the plug connector or into the housing component can also be considered to be part of the housing component.

In accordance with the invention, the housing component has a cable-side axial portion and a plug-side axial portion adjoining the cable-side portion along the longitudinal axis of the housing component or the longitudinal axis of the plug connector. The cable-side portion has a cable bushing for the cable running along the longitudinal axis.

Preferably, the plug-side portion directly adjoins the cable-side portion, in particular in one piece. However, it is also possible for the housing component to be composed of several parts from the plug-side portion and the cable-side portion, the plug-side portion preferably being joined to the cable-side portion, in particular in an integrally bonded manner (e.g. glued or welded), a frictionally engaged manner (e.g. pressed together) and/or in an interlocking manner (e.g. latched together).

In particular, if the housing component is used in combination with a sealing element, the plug-side portion may be the portion of the housing component close to the seal and facing the seal, and the cable-side portion may be the portion of the housing component remote from the seal and facing away from the seal.

The cable bushing extends completely through the cable-side portion, preferably parallel to the longitudinal axis, particularly preferably coaxial with the longitudinal axis. The cable bushing is preferably a through-bore.

The cable bushing is preferably adapted to the cross-sectional geometry of the cable and, in particular, is round in shape to accommodate round cables. In principle, however, the cable bushing can also be oval or even quadrangular. Preferably, the cable bushing is designed to accommodate exactly one cable, although in principle it is also possible to pass more than one cable through a common cable bushing. The inner diameter of the cable bushing preferably corresponds to the outer diameter of the cable or the cable sheath of the cable, but can also be slightly larger or slightly smaller than the outer diameter of the cable, in particular within tolerances.

The inner diameter of the cable bushing can be, for example, 0.5 cm to 3 cm, preferably 1 cm to 2 cm, particularly preferably about 1.5 cm.

It may be provided that the housing component has a plurality of cable bushings in the cable-side portion, for example one cable bushing for each cable to be inserted into the plug connector. Thus, for example, the housing component may have exactly one cable bushing, exactly two cable bushings, exactly three cable bushings, exactly four cable bushings, or even more cable bushings. For simplicity, the invention is described below as having primarily a single cable bushing, although this is not to be understood as limiting. All embodiments and developments described below can in principle also be extended for use with multiple cables.

In accordance with the invention, the housing component has at least one fluid channel formed in the cable bushing and open towards the cable or towards the longitudinal axis, in order to conduct away a fluid which has penetrated between the cable bushing and the cable (i.e. when the cable has passed through the cable bushing) in a defined manner into the plug-side portion.

In the context of the invention, a fluid can preferably be a liquid, such as water or dirty water. However, the fluid may also be a gas or gas mixture.

As a rule, such a fluid is able to penetrate the plug connector or housing component through tolerance-induced gaps between the cable and the cable bushing, primarily in parallel in the direction of the plug-side portion. The proposed fluid channel makes it possible to guide the penetrating fluid in a defined manner into the plug-side portion, i.e. to deflect it in a defined or targeted manner in the circumferential direction, starting from an undefined flow direction or one that is substantially parallel to the longitudinal axis.

In this context, a “defined” conduction away of the fluid is to be understood as a deliberate or targeted deflection of the fluid flow in the circumferential direction of the cable bushing (by means of a correspondingly targeted design of the fluid channel)—in contrast to an uncontrollable or random deflection of the fluid flow, for example due to unevennesses of the cable, the inner lateral surface, or due to contamination in the cable bushing.

The fluid channel may be formed in one piece with the housing component. However, it can also be provided that the fluid channel or a group of a plurality of fluid channels is/are formed by a separate component or by a separate assembly which is inserted accordingly into the cable bushing, in particular is fastened in the cable bushing. The separate component or the separate assembly may be, for example, a hose or an inner sleeve inserted into the cable bushing.

In a preferred embodiment of the invention, a plurality of fluid channels are provided that run circumferentially side by side through the cable bushing, for example two fluid channels, three fluid channels, four fluid channels, five fluid channels, six fluid channels, seven fluid channels, eight fluid channels, nine fluid channels, ten fluid channels, or even more fluid channels. In principle, however, even a single fluid channel can be sufficient.

In accordance with the invention, the fluid channel winds through the cable bushing at least in portions along the longitudinal axis.

The fluid channel describes a curved or arcuate course along the inside of the cable bushing in particular. Preferably, the fluid channel runs in less than one turn, for example in less than half a turn or even less.

In accordance with the invention, the housing component has at least one outlet opening in the plug-side portion in order to discharge the fluid from the housing component transversely or at an angle (but not necessarily orthogonally) to the longitudinal axis.

The outlet opening can have any geometry, for example can be primarily round, but preferably primarily quadrangular.

In principle, a single outlet opening or exactly two outlet openings may already be sufficient. However, even more outlet openings can be provided, for example two, three, four, five, six or even more outlet openings arranged distributed along the circumference of the housing component.

The combination, proposed in accordance with the invention, of a fluid channel arranged in the cable bushing and of the at least one outlet opening allows the incoming fluid to be first deflected and then discharged from the housing component. This allows the housing component to provide a seal-like effect. The proposed housing component thus makes it possible, if necessary, to dispense with a separate, conventional sealing element or to use a significantly less complex sealing element, in particular one that is also shortened in the axial direction, since the housing component itself can already provide a sealing effect for the plug connector.

In particular, a combination of the proposed housing component with a conventional sealing element can increase the sealing effect of the plug connector to a surprising degree. For example, such a plug connector can provide a significantly improved sealing effect against a fluid flow entering the housing component at high pressure and thus can provide a good sealing effect against a high-pressure jet or a steam jet.

Due to the fact that the fluid is at least partially deflected in the circumferential direction by the fluid channel, a substantial portion of the fluid flow can already be deflected out of the housing component through the at least one outlet opening, as a result of which this portion of the fluid flow no longer impinges on the sealing element. As a rule, a reduced portion of the fluid quantity will then still impinge on the sealing element before this portion also exits the housing component, but this takes place with correspondingly reduced pressure, which is why the load on the sealing element is significantly lower.

In an advantageous development of the invention, it can be provided that at least one elevation is formed on an inner lateral surface of the cable bushing in order to form the at least one fluid channel. Preferably, the elevation for this purpose winds through the cable bushing at least in portions along the longitudinal axis.

An incoming fluid or a fluid flow can advantageously be broken at the elevation or elevations. The elevations can therefore advantageously protect an axial portion located after the housing component or after the cable-side portion of the housing component in the direction of fluid flow from direct impact by the fluid flow.

The elevation can in particular be a web or a rib. Preferably, the web or rib extends along the longitudinal axis completely or without interruption through the cable bushing. However, it may also be provided that the elevation is formed as a pin or as a rib segment, with several pins and/or rib segments forming a common group being arranged one behind the other along the longitudinal axis (optionally spaced apart from one another along the longitudinal axis and/or in the circumferential direction), so that the totality of all pins or rib segments of the group winds through the cable bushing.

Preferably, a plurality of ribs, webs, pins, rib segments and/or groups of pins/rib segments are arranged distributed circumferentially in the cable bushing (in particular spaced apart from one another) to form boundaries for various fluid channels.

Preferably, the at least one elevation, for example the rib, is formed in one piece with the housing component. The elevation can therefore be formed directly in the cable bushing, for example as part of a joint production process. However, the at least one elevation may also have been formed by a separate component or assembly and subsequently fitted in the cable bushing, for example in an interlocking, frictionally engaged, but in particular integrally bonded manner. The elevation can, for example, be molded onto the inner lateral surface of the cable bushing.

Preferably, the at least one elevation is formed from a plastic, in particular from the same plastic from which the housing component is also formed. However, the elevation itself can also be formed in the manner of a seal, for example from a partially elastic material such as rubber or silicone. In this case in particular, it may be advantageous to mold the elevations onto the inner lateral surface of the cable bushing.

According to a development of the invention, it may be provided that the inner diameter of the cable bushing and/or of the at least one fluid channel are formed such that the cable rests on the fluid channel (in particular on the elevations) when the cable is received in the cable bushing.

It may be provided that the cable seals the fluid channel on the inside, i.e. in the direction of the longitudinal axis.

As mentioned above, the fluid channel is open towards the cable. The cable can thus limit or close off the fluid channel, in particular seal it, when it is inserted into the cable bushing. In so doing, the elevations of the fluid channels can press into the cable sheath of the cable. In an advantageous manner, the fluid can thus flow exclusively or at least substantially only through the fluid channels into the plug-side portion.

Even if, however, an additional gap remains between the cable and the fluid channel or between the cable and the elevations of the fluid channel due to manufacturing tolerances, this gap is expected to be many times smaller than the deliberately defined fluid channel. Thus, the predominant fluid flow will be through the fluid channel or channels. Furthermore, in this case, as expected, there will be a pressure reduction due to the Bernoulli effect and thus a distribution/spraying of the fluid as it exits the gap between the cable and the elevations, which means that the negative influence of this uninfluenceable fluid flow may ultimately be negligible.

Alternatively or in addition to an embodiment of the fluid channels by various elevations, it can also be provided in an embodiment of the invention that the at least one fluid channel is formed by depressions formed on the inner lateral surface of the cable bushing, in particular by grooves extending along the longitudinal axis. A combination of grooves and elevations may also be provided to form the at least one fluid channel.

According to a development of the invention, it can be provided that the at least one fluid channel winds through the cable bushing in such a way that a direct passage for the fluid through the cable-side portion, said passage running solely in the longitudinal axial direction or parallel to the longitudinal axis, is at least disturbed or obstructed, preferably completely blocked.

It may be provided, for example, that the plug-side portion (in particular a sealing element arranged in the plug-side portion) is completely or at least substantially concealed in a plan view of the housing component directed towards the plug-side portion, i.e. in a view through the cable bushing, when the cable is accommodated in the cable bushing. A direct line of sight and thus also a direct fluid connection from the cable-side end of the housing component into the plug-side portion is thus preferably completely blocked by the cable and the fluid channel.

By blocking a direct passage for the fluid, the fluid flow is necessarily deflected from its original, usually straight-line orientation, which can especially increase the resistance of the plug connector to a directed high-pressure fluid jet. In this way, steam jet resistances of 80 bar or more can be made possible.

In a development of the invention, it may be provided that the at least one fluid channel winds helically through the cable bushing.

A helical course of the fluid channel has proven to be particularly advantageous for guiding the fluid in a controlled manner on its way through the cable bushing. In principle, however, the course of the fluid channel through the cable bushing can be arbitrary, for example spiraled, helical or linear. A continuous or stepped course can be provided.

In particular, a helical arrangement of elevations, in particular ribs or rib segments, can be provided on the inner lateral surface.

In a development of the invention, it can be provided that the plug-side portion has, at least in some regions, at least one outer wall running around the longitudinal axis in order to delimit, at least in some regions, a cavity, at least one of the fluid channels opening out into the cavity.

If necessary, several cavities can also be provided, for example cavities at least partially separated from one another by intermediate walls, the fluid channels being able to be divided between the various cavities. For example, one of the fluid channels can then open out into exactly one of the cavities. As a rule, however, one common cavity is sufficient for all fluid channels.

The outer wall is preferably formed in one piece with the housing component. However, the outer wall can also be formed as a separate component or as a separate assembly and can be connected to the housing component or to the plug-side portion of the housing component, in particular can be connected in an integrally bonded, frictionally engaged and/or interlocking manner. The at least one outer wall can, for example, be formed as a separate sleeve or as an at least partially annular body and can be latched or pressed to the plug-side portion at the end face or on the outside.

Exactly one outer wall can be provided, but if necessary, multiple outer walls can be provided, distributed along the perimeter of the housing component, such as two outer walls, three outer walls, four outer walls, or even more outer walls.

The at least one outer wall can preferably have connecting elements for connecting the housing component to the plug connector housing of the plug connector and/or to a sealing element of the plug connector, in particular latching elements, a threaded portion (for example an internal thread or an external thread) or a portion designed for an interference fit. Such connecting elements are not absolutely necessary, however, because the housing component can also be formed integrally with the plug connector housing of the plug connector.

In an advantageous development of the invention, it can be provided that the at least one outlet opening is formed in the at least one outer wall. The outlet opening can, for example, be formed as a window or as a slot in the at least one outer wall.

Alternatively or additionally, however, the at least one outlet opening can also be formed between a plurality of said outer walls.

In a particularly preferred embodiment, exactly two, exactly three or exactly four outer walls spaced apart from one another along the circumference of the housing component can be provided, between which there are formed corresponding outlet openings.

In a development of the invention, it can be provided that a plug-side volume provided to the fluid by means of the cavity is larger than a cable-side volume provided to the fluid in the cable-side portion.

The cable-side volume usually results from a distance between the cable sheath of the cable and the inner lateral surface of the cable bushing, and in particular by the sum of the individual volumes provided by the individual fluid channels. Thus, the volume provided for the fluid in the cable-side portion is based on the individual flow cross sections of the fluid channels. Thus, in particular, the height of the at least one elevation on the inner lateral surface of the cable bushing can determine the individual volume of the corresponding fluid channel—and thus also the cable-side volume made available in the cable-side portion.

Because the plug-side volume in the plug-side cavity is larger than the cable-side volume, there is a sudden reduction in the pressure in the fluid at the end of the at least one fluid channel due to the immediate increase in volume caused by the Bernoulli effect. The flow velocity of the fluid is significantly greater in the cable-side portion than in the plug-side portion due to the smaller cable-side volume. This ultimately results in a fanning out of the fluid flow or a spraying of the fluid as it exits the at least one fluid channel, which is why the fluid acts less selectively on, for example, a downstream sealing element. An original axial directional component of the fluid, which has already been partially diverted in the circumferential direction by the fluid channels, is thus further reduced or distributed over various directional vectors.

In an advantageous development of the invention, it can be provided that the inner diameter of the housing component in the plug-side portion is larger than the inner diameter of the cable bushing. In particular, it can be provided that a support surface running transversely to the longitudinal axis (but not necessarily orthogonally) is formed between the cable bushing and the at least one outer wall.

Between the at least one outer wall and the cable bushing, a shoulder or a step can be provided within the housing component, thereby forming an inner end surface. This surface, referred to herein as the "support surface", is preferably annular and runs around the cable bushing. The at least one outer wall is preferably arranged along the outer periphery of the support surface (in particular directly at the outer edge of the support surface, but optionally also spaced from the edge).

In an advantageous development of the invention, it can be provided that a plurality of support elements are arranged distributed on the support surface in order to mechanically contact a sealing element of the plug connector adjacent to the housing component.

Preferably, the support elements are arranged uniformly distributed around the cable bushing and spaced apart from each other. In particular, the support elements can be distributed equidistantly.

The support elements preferably rise from the support surface along the longitudinal axis, particularly preferably parallel to the longitudinal axis. The support elements can, for example, be formed in the manner of props, webs, pins or other structures. The support elements are preferably formed in one piece from the housing component.

The support elements may be spaced from the at least one outer wall and/or from the cable bushing.

The support elements can be used to fix the optional sealing element (in particular for axial fixation/support along the longitudinal axis). By means of the support elements, for example, a mechanical force can be applied to the sealing element when the housing component is mounted on the plug connector housing in order to cause a radial expansion of the sealing element by axially compressing it to support the sealing function.

Preferably, at least one intermediate channel is formed in each of the support elements and/or between the support elements, with at least one of the fluid channels opening out into each of the intermediate channels.

For example, recesses such as windows or slots can be provided in the support elements to form the intermediate channel. Preferably, however, the intermediate channels are formed between the individual support elements.

The fluid channels can open out into the intermediate channels such that the path provided to the fluid extends correspondingly from the fluid channels through the intermediate channels to then run to the outlet openings.

The number of intermediate channels can preferably correspond to the number of fluid channels. However, fewer intermediate channels can also be provided than fluid channels, for example—or vice versa. A plurality of fluid channels can therefore also open out into a common intermediate channel.

In an advantageous development of the invention, it can be provided that the at least one fluid channel has, at a plug-side end portion, a deflecting portion running at least substantially parallel to the longitudinal axis in order to introduce the fluid in a targeted manner, starting from the fluid channel, into one of the intermediate channels.

Preferably, the deflecting portions are formed in one piece with the structures forming the fluid channels, for example in one piece with the elevations (for example the ribs or rib segments). The fluid channel can have a kink at the transition to the deflecting portion.

The deflecting portions can be particularly advantageous if the individual support elements on the support surface are spaced apart from the cable bushing. The deflecting portions can then in particular prevent the individual fluid flows separated by the fluid channels from flowing together again.

In a development of the invention, it can be provided that, between the at least one outer wall and the support elements, there is formed running around the support elements an outer channel, into which the individual intermediate channels open out, and which is designed to conduct the fluid to the at least one outlet opening.

A common outer channel can be particularly advantageous for guiding the fluid conducted via the fluid channels and the intermediate channels to the outlet openings. An annular outer channel can be particularly advantageous if fewer outlet openings are provided than fluid channels and/or intermediate channels. In this way, the individual fluid flows can be brought together in the outer channel and discharged together from the outlet opening.

The invention also relates to a plug connector, comprising the housing component according to the foregoing and following embodiments and at least one sealing element adjacent along the longitudinal axis to the plug-side portion of the housing component or arranged in the plug-side portion and mountable externally on the cable.

The plug connector according to the invention can be used particularly advantageously within a vehicle, in particular a motor vehicle. Possible fields of application include, in particular, high-voltage plug connectors for e-mobility. However, data plug connectors, for example for autonomous driving, driver assistance systems or navigation systems, can also be provided. The term "vehicle" describes any means of transport, in particular vehicles on land, water or in the air, including space vehicles. In principle, however, the plug connector according to the invention is suitable for any application within the entire field of electrical engineering and is not to be understood as being restricted to use in vehicle technology or high-voltage technology. In particular, the plug connector can also be formed as a plug connector for high-frequency technology.

The sealing element can be, in particular, a conventional sealing element of a plug connector, for example an annular sealing element that can be applied to a cable sheath of the cable. The sealing element can be formed, for example, as a profile seal and can have one or more sealing lips, which are formed on the cable side or inside and/or on the plug connector side or outside.

The cable is preferably not part of the plug connector according to the invention, but can advantageously be used together with the plug connector.

The proposed combination of housing component and sealing element makes it possible to achieve a particularly advantageous sealing effect without having to improve or strengthen the sealing element itself. A conventional sealing element can thus be used in an unchanged form to improve the sealing effect in conjunction with the housing component. The proposed housing component can advantageously deflect, for example, a portion of a high-pressure water jet away from the sealing element, whereby only a fluid stream or water jet with a reduced pressure impinges on the sealing element, which can be safely repelled by the sealing element.

The proposed fluid channels can form individual passages for the fluid so that the fluid is divided into a plurality of individual channels or individual flows and, in particular, is deflected from an axial flow direction (along or parallel to the longitudinal axis) into a flow direction in the circumferential direction. Preferably, the fluid flow thus no longer has exclusively an axial flow component when exiting the individual fluid channels, but also a flow component in the circumferential direction.

The outlet openings provided in the housing component allow the fluid flow influenced in this way to escape laterally from the housing component and thus from the plug connector. The remaining pressure and the remaining amount of fluid acting on the sealing element are thus significantly reduced.

Preferably, the fluid channel runs in a spiral or helical shape through the cable bushing of the housing component.

The fluid channels can additionally make the cable easier to mount in the cable bushing.

The invention also relates to a plug connector assembly comprising a plug connector according to the foregoing and following embodiments, and said cable.

In an advantageous manner, the plug connector housing can be shortened in the longitudinal direction using the proposed housing component. In particular, this can provide a compact end cap with high steam jet resistance. In contrast to the prior art, in which, in the case of such end caps, the cap dome for achieving sufficient steam jet resistance and/or a sealing element must be extended in the axial direction, the proposed invention can save installation space and thus in particular also material and costs in the production of the plug connector.

The cable is preferably an electrical cable (data cable for data transmission and/or supply cable for electrical power supply). An electrical cable for transmitting high currents with voltages of up to 1,500 volts or more is particularly preferred. However, an optical cable may also be provided.

Preferably, a coaxial cable is provided.

Preferably, the cable has at least one inner conductor and one cable sheath. In principle, however, the cable can have more than one inner conductor, for example two, three, four or even more inner conductors. The cable can additionally comprise an outer conductor, for example an outer conductor shield, such as a cable shield braid. Optionally, the cable can further comprise a cable foil. In principle, the specific design of the cable is not important.

In the context of the invention, the term "cable" may also be understood to mean, where appropriate, a single conductor (inner conductor and an insulation sheathing the inner conductor) of a multi-core cable having a plurality of such single conductors. The invention may therefore also be suitable for sealing, for example, a contact part carrier into which one or more individual cables are inserted for connection to corresponding contact elements. As a rule, however, the plug connector is already sealed in the region of the cable feed, which is why separate sealing of the individual leads is no longer necessary.

Multiple cables may also be provided, which are inserted into a common plug connector. The cables may be passed through a common housing component or through respective housing components. Insofar as multiple cables are passed through a common housing component, the cables can be passed through a common cable bushing or through respective cable bushings in the housing component.

The invention also relates to an alternative housing component for a plug connector, in particular an end cap for a plug connector housing, having a cable-side axial portion and a plug-side axial portion adjoining the cable-side portion along a longitudinal axis, the cable-side portion having a cable bushing for a cable running along the longitudinal axis. With respect to this alternative housing component, a cable-side volume for a fluid penetrated between the cable bushing and the cable in the cable-side portion is smaller than a plug-side volume provided to the fluid in the plug-side portion, with at least one outlet opening being formed in the plug-side portion in order to discharge the fluid from the housing component transversely to the longitudinal axis.

The aforementioned housing component (i.e., the housing component according to claim 13) is sometimes referred to hereinafter as the "alternative housing component" for the purpose of distinguishing it from the housing component of claim 1. It should be emphasized, however, that the foregoing and subsequent statements in the description, claims and figures may refer equally to the housing component of claim 1 and to the "alternative housing component" of claim 13, unless otherwise indicated. This is particularly (but not exclusively) true with respect to features and advantages of the fluid channels, the outer walls, and the support elements. Thus, for example, the claims dependent on claim 1 may also represent corresponding further developments of claim 13. In particular, the characterizing part of claim 1 may also represent a further development of claim 13.

The alternative housing component represents an alternative solution for the uniform task according to the invention, which is expediently reproduced separately herein. The two housing components have a relationship with one another in that it is ensured that a fluid entering the cable bushing in the plug-side portion only has a weakened effect in the axial direction along the longitudinal axis, and can therefore be discharged particularly easily from the laterally arranged outlet openings.

The fact that the fluid flows from a small volume into a larger volume reduces the pressure in the medium, which means that the fluid can be discharged particularly well through the drain openings without significantly stressing a downstream sealing element.

The invention also relates to a plug connection, comprising the plug connector described above and below and a mating plug connector.

Features that have been described in conjunction with one of the subjects of the invention, namely given by one of the housing components, the plug connector, the plug connection or the plug connector assembly according to the invention, can also be advantageously implemented for the other subjects of the invention. Likewise, advantages mentioned in conjunction with one of the subjects of the invention can also be understood as relating to the other subjects of the invention.

It should also be noted that terms such as "comprising", "having" or "with" do not exclude other features or steps. Furthermore, terms such as "a" or "the" that indicate a singular number of steps or features do not exclude a plurality of features or steps—and vice versa.

However, in a purist embodiment of the invention, it may also be provided that the features introduced in the invention by the terms "comprising", "having" or "with" are listed exhaustively. Accordingly, one or more listings of features can be considered exhaustive within the scope of the invention, for example each considered for each claim. For example, the invention can consist solely of the features recited in claim 1.

It should be noted that designations such as "first" or "second," etc., are used primarily for the purpose of distinguishing respective device or method features and are not necessarily intended to imply that features are mutually dependent or interrelated.

Furthermore, it should be emphasized that the values and parameters described herein include deviations or fluctuations of ±10% or less, preferably ±5% or less, further preferably ±1% or less, and most preferably ±0.1% or less of the particular designated value or parameter, provided that these deviations are not excluded in the implementation of the invention in practice. The specification of ranges by initial and final values also includes all those values and fractions which are included by the particular designated range, in particular the starting and end values and a corresponding mean value.

BRIEF DESCRIPTION OF THE FIGURES

Exemplary embodiments of the invention are described in more detail below with reference to the drawings.

The figures each show preferred exemplary embodiments in which individual features of the present invention are shown in combination with one another. Features of one exemplary embodiment can also be implemented separately from the other features of the same exemplary embodiment and can accordingly be readily combined by a person skilled in the art to form further useful combinations and subcombinations with features of other exemplary embodiments.

In the figures, functionally like elements are provided with the same reference signs.

In the figures:

Figure 1:
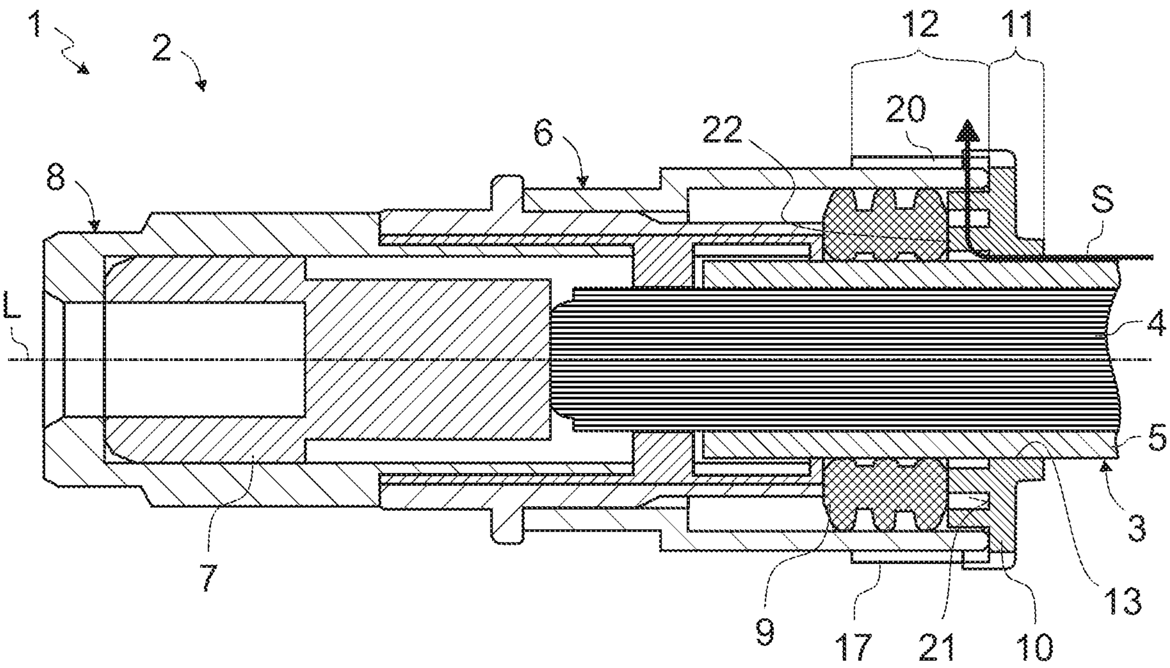
Figure 2:
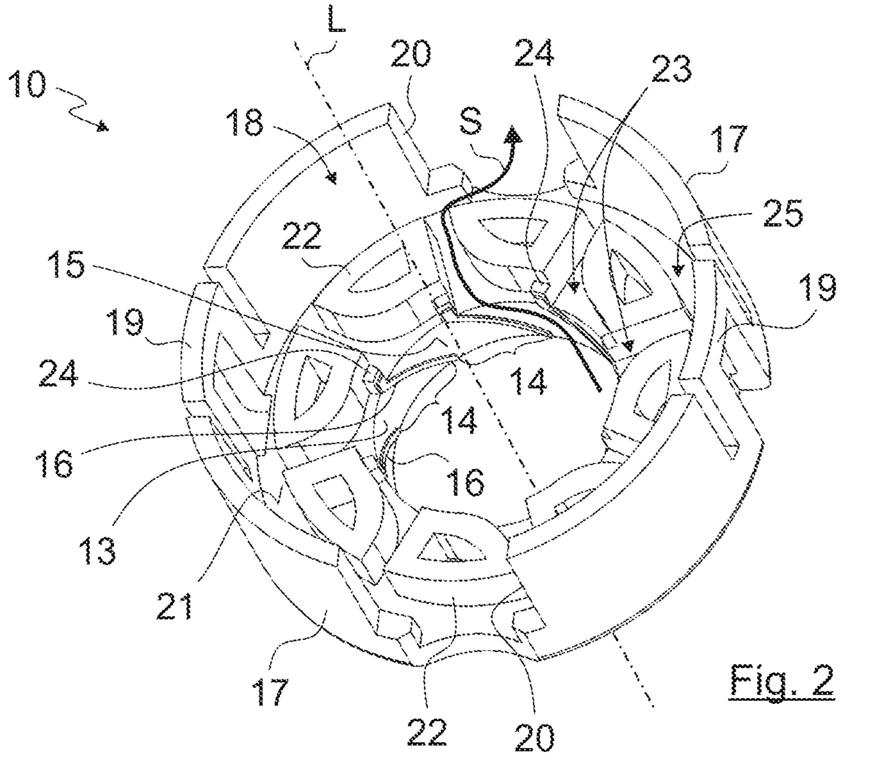
Figure 3:
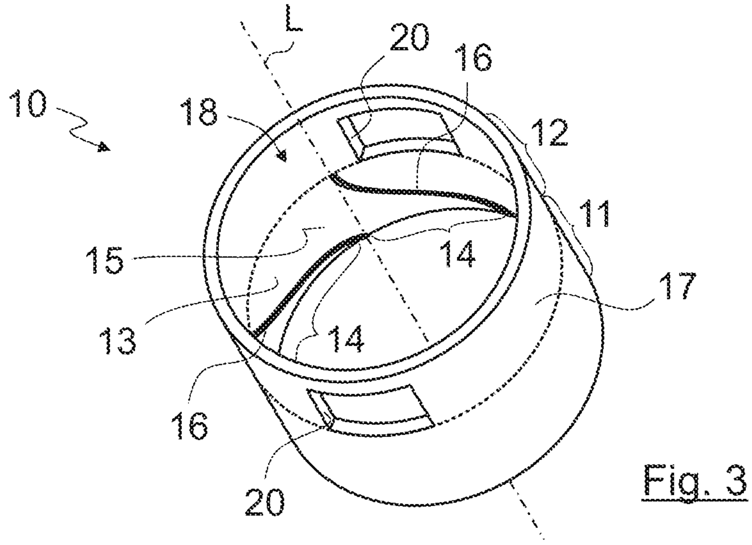
Figure 4:
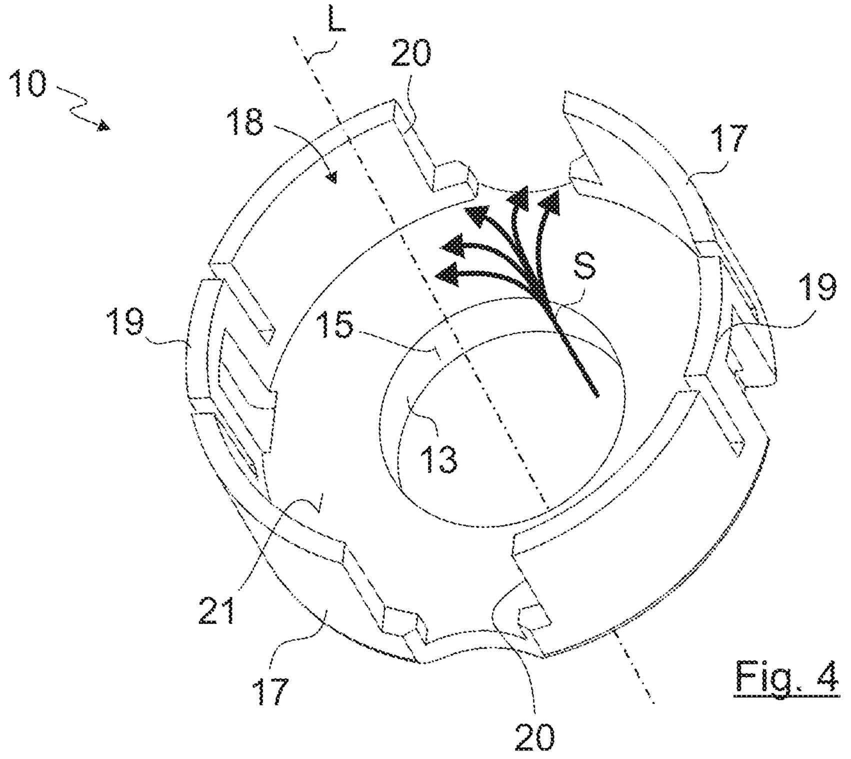

FIG. 1 schematically shows a plug connector assembly according to the invention in a sectional side view, with a plug connector comprising a housing component formed as an end cap according to a first exemplary embodiment of the invention, as well as an electrical cable;

FIG. 2 schematically shows an individual perspective view of the housing component according to FIG. 1;

FIG. 3 schematically shows an individual perspective view of a housing component according to a second exemplary embodiment of the invention; and FIG. 4 schematically shows an individual perspective view of the alternative housing component of the invention.

DETAILED DESCRIPTION OF THE ENABLING EMBODIMENTS

FIG. 1 shows, by way of example and schematically, a plug connector assembly 1 according to the invention in a lateral sectional view. The plug connector assembly 1 has a plug connector 2 and a cable 3. In the exemplary embodiment, an electrical plug connector 2 and an electrical cable 3 are shown, but this is not to be understood as limiting.

The cable 3 has an inner conductor 4 and a cable sheath 5, although in principle any type of cable can be provided, for example also cables with a plurality of inner conductors, different dielectrics and/or outer conductors (e.g. a cable shielding braid and/or a cable foil). The cable 3 is inserted into the plug connector 2 starting from a cable end of a multi-part plug connector housing 6. In a central portion of the plug connector 2, the inner conductor 4 of the cable 3 is connected to a contact element 7 of the plug connector 2, for example welded in an integrally bonded manner. Furthermore, the plug connector 2 has a plug-side end with a plug interface 8 for connection to a corresponding mating plug connector (not shown).

In addition, the plug connector 2 comprises a sealing element 9, which is mounted on the outside of the cable sheath 5 and which is axially fixed to the cable-side end of the plug connector housing 6 by a housing component 10 formed as an end cap. The housing component 10 shown schematically in FIG. 1 is shown in an individual perspective view in FIG. 2. FIG. 3 shows a further exemplary embodiment, which is explained below together with the first exemplary embodiment.

The housing component 10 has a cable-side axial portion 11 (cf. FIG. 1) and a plug-side axial portion 12 (cf. FIG. 1) adjoining the cable-side portion 11 along the longitudinal axis L. The cable-side portion 11 has a cable bushing 13 for the cable 3. A cable bushing 13 for the cable 3 running along the longitudinal axis L is formed in the cable-side portion 11. The cable bushing 13 is adapted as accurately as possible to the outer diameter of the cable 3.

In the case of the housing component 10 shown in FIGS. 1 to 3, the cable bushing 13 has a plurality of fluid channels 14 open towards the cable 3 (cf. in particular FIGS. 2 and 3) in order to conduct away a fluid (not shown) that has penetrated between the cable bushing 13 and the cable 3 in a defined manner into the plug-side portion 12. The fluid channels 14 wind at least in portions along the longitudinal axis L through the cable bushing 13, with preferably less than one turn per fluid channel 14 being provided.

It is preferably provided that the fluid channels 14 wind through the cable bushing 13 in such a way that a direct passage for the fluid, i.e. in particular a passage which runs solely parallel to the longitudinal axis L, through the cable-side portion 11 into the plug-side portion 12 is blocked. In this respect, a helical course of the fluid channels 14 has proved to be particularly advantageous, as indicated in FIGS. 2 and 3.

To form the individual fluid channels 14, elevations 16 in the manner of ribs are formed on an inner lateral surface 15 of the cable bushing 13. The inner diameter of the cable bushing 13 and the height of the elevations 16 or the fluid channels 14 are formed such that the cable 3 rests on the fluid channels 14 and seals the fluid channels 14 on the inside, i.e. in the direction of the longitudinal axis L.

Between the cable sheath 5 of the cable 3 and the inner lateral surface 15 of the cable bushing 13, the cable-side volume can be provided based on the individual flow cross sections of the fluid channels 14. The total cable-side flow cross section defining the cable-side volume in the cable-side portion 11 can thus be advantageously influenced, in particular by modifying the elevations 16.

As can be seen from the exemplary flow path S shown in FIG. 2, the fluid is deflected in a defined manner on its way through the cable bushing 13 and, as it emerges from the cable-side portion 11, exhibits not only an axial movement component but also a movement component directed in the circumferential direction, which significantly reduces the load on the downstream sealing element 9.

The plug-side portion 12 has outer walls 17 arranged circumferentially around the longitudinal axis L at least in some regions. In the exemplary embodiment of FIGS. 1 and 2, exactly two outer walls 17 are provided, which together delimit, at least in some regions, a cavity 18 in the plug-side portion 12, into which the fluid channels 14 open out. In this case, the plug-side volume made available to the fluid by means of the cavity 18 is significantly larger than the cable-side volume made available to the fluid in the cable-side portion 11. In this way, when the fluid enters the plug-side portion 12, a pressure loss takes place because the flow rate of the fluid in the fluid channels 14 is higher due to the significantly smaller volume. In this way, there is some spraying of the fluid as it enters the plug-side portion 12, which further reduces the stress on the sealing element 9.

Optionally, connecting elements may be provided in the outer walls 17, such as latching elements 19, to latch with another component of the plug connector housing 6.

Lastly, the fluid in the plug-side portion 12 can be discharged from the housing component 10 through corresponding outlet openings 20 transverse to the longitudinal axis L. In the exemplary embodiment of FIGS. 1 and 2, the outlet openings 20 are formed between the individual outer walls 17.

Alternatively or additionally, however, the outlet openings 20 can also be formed within the outer walls 17, for example in the manner of a window or a slot. By way of example, FIG. 3 shows a further exemplary embodiment of a housing component 10 according to the invention, in which only a single outer wall 17 is provided, in which corresponding windows are provided to form the outlet openings 20.

In the exemplary embodiment of FIGS. 1 and 2, the inner diameter of the housing component 10 in the plug-side portion 12 is larger than in the cable bushing 13, which is why a support surface 21 running transversely to the longitudinal axis L is formed between the cable bushing 13 and the at least one outer wall 17.

However, a support surface 21 is not necessarily required, as shown by way of example on the basis of the exemplary embodiment shown in FIG. 3. In the exemplary embodiment shown in FIG. 3, the inner diameter of the housing component 10 in the plug-side portion 12 corresponds to the inner diameter in the cable bushing 13. The housing component 10 is therefore completely sleeve-shaped in FIG. 3—in contrast to the housing component 10 in cap form shown in FIG. 2.

An increase in the inner diameter as shown in FIGS. 1 and 2 has proved particularly suitable for reducing the pressure of the fluid in the plug-side cavity to a particularly large extent due to the Bernoulli effect.

Optionally, a plurality of support elements 22 can be arranged distributed on the support surface 21, as shown in FIGS. 1 and 2. The support elements 22 are preferably arranged uniformly around the cable bushing 13. By means of the support elements 22, the housing component 10 is able to contact the sealing element 9 mechanically and therefore to fix or support it axially. In the exemplary embodiment, the support elements 22 are formed in one piece from the housing component 10 in the manner of props.

Between the support elements 22, there are formed respective intermediate channels 23, into each of which one of the fluid channels 14 opens out. In this way, the fluid can still be discharged laterally from the housing component 10 advantageously and comparatively directly despite the support elements 22. Alternatively or in addition to intermediate channels 23 between the support elements 22, intermediate channels 23 can also be provided which extend through the individual support elements 22 (not shown in the exemplary embodiments).

It has been found to be advantageous to provide deflecting portions 24 running parallel to the longitudinal axis L at a plug-side end portion of the fluid channels 14 or of the elevations 16, in order to introduce the fluid even more selectively into the intermediate channels 23 starting from the fluid channel 14. This is particularly advantageous if the support elements 22 on the support surface 21 are spaced from the cable bushing 13, as shown.

Between the outer walls 17 and the support elements 22, an outer channel 25 can be formed running around the support elements 22, as can be seen in FIG. 2. The individual intermediate channels 23 can open out into the common outer channel 25 in order to discharge the fluid collected from the outlet openings 20.

To illustrate that an alternative housing component 10 can also be provided as part of the overall concept of the invention, FIG. 4 again shows an end cap for a plug connector housing 6, which has a cable-side portion 11 and a plug-side portion 12 adjoining the cable-side portion 11 along the longitudinal axis L. The cable-side portion 11 has a cable bushing 13 for the cable 3. Again, a cable bushing 13 for the cable 3 running along the longitudinal axis L is provided in the cable-side portion 11.

Unlike the housing component 10 described in FIGS. 1 to 3, however, the alternative housing component 10 of FIG. 4 does not have fluid channels 14, but instead employs a different strategy, which is also advantageous, to reduce the effect of fluid flow on the sealing element 9 in the plug-side portion 12.

According to the alternative housing component 10, it is provided that the plug-side volume made available to the fluid in the plug-side portion 12 is larger than the volume in the cable-side portion 11. This can be ensured, for example, by the fact that the volume in the cavity 18 enclosed by the at least one outer wall 17 in the plug-side portion 12 is designed to be significantly larger than a tolerance-induced volume between the inner lateral surface 15 of the cable bushing 13 and the cable sheath 5 of the cable 3. In this way, when the fluid enters the plug-side portion 12, the fluid is sprayed (cf. the flow path S indicated by way of example in FIG. 4) and thus the pressure is significantly reduced. Lastly, the fluid can exit from the housing component 10 through the outlet openings 20 formed in the housing component 10, transversely to the longitudinal axis L.

What is claimed is:

1. A housing component for a plug connector, in particular an end cap for a plug connector housing, comprising:

a cable-side axial portion and a plug-side axial portion adjoining the cable-side portion along a longitudinal axis, the cable-side portion having a cable bushing for a cable running along the longitudinal axis;

at least one fluid channel formed in the cable bushing and open towards the cable, in order to conduct away a fluid which has penetrated between the cable bushing and the cable in a defined manner into the plug-side portion, the fluid channel winding through the cable bushing at least in portions along the longitudinal axis, and at least one outlet opening being formed in the plug-side portion in order to discharge the fluid from the housing component transversely to the longitudinal axis (L);

wherein the plug-side portion has, at least in some regions, at least one outer wall running around the longitudinal axis in order to delimit, at least in some regions, a cavity, the at least one fluid channel opening out into the cavity; and wherein the at least one outlet opening is formed in the at least one outer wall and/or between a plurality of said outer walls.

2. The housing component according to claim 1, further comprising:

at least one elevation, in particular a rib, formed on an inner lateral surface of the cable bushing and winding through the cable bushing at least in portions along the longitudinal axis in order to form the at least one fluid channel.

3. The housing component according to claim 1, wherein the at least one fluid channel is formed in such a way that the cable can rest on the fluid channel in order to seal the fluid channel on the inside, in the direction of the longitudinal axis.

4. The housing component according to claim 1, wherein the at least one fluid channel winds through the cable bushing in such a way that a direct passage for the fluid through the cable-side portion into the plug-side portion, said passage running solely longitudinal axial direction, is blocked.

5. The housing component according to claim 1, wherein the at least one fluid channel winds helically through the cable bushing.

6. A housing component for a plug connector, in particular an end cap for a plug connector housing, comprising:

a cable-side axial portion and a plug-side axial portion adjoining the cable-side portion along a longitudinal axis, the cable-side portion having a cable bushing for a cable running along the longitudinal axis;

at least one fluid channel formed in the cable bushing and open towards the cable, in order to conduct away a fluid which has penetrated between the cable bushing and the cable in a defined manner into the plug-side portion, the fluid channel winding through the cable bushing at least in portions along the longitudinal axis, and at least one outlet opening being formed in the plug-side portion in order to discharge the fluid from the housing component transversely to the longitudinal axis (L);

wherein the plug-side portion has, at least in some regions, at least one outer wall running around the longitudinal axis in order to delimit, at least in some regions, a cavity, the at least one fluid channel opening out into the cavity; and a plug-side volume provided to the fluid by means of the cavity being larger than a cable-side volume provided to the fluid in the cable-side portion.

7. The housing component according to claim 1, wherein the inner diameter of the housing component in the plug-side portion is larger than in the cable bushing, and a support surface running transversely to the longitudinal axis being formed between the cable bushing and the at least one outer wall.

8. The housing component according to claim 7, further comprising:

a plurality of support elements arranged distributed on the support surface, preferably uniformly distributed around the cable bushing, in order to mechanically contact a sealing element of the plug connector adjacent to the housing component;

at least one intermediate channel being formed in each of the support elements and/or between the support elements; and the at least one fluid channel opening out into the at least one intermediate channel.

9. The housing component according to claim 8, wherein the at least one fluid channel has, at a plug-side end portion, a deflecting portion running at least substantially parallel to the longitudinal axis in order to introduce the fluid in a targeted manner, starting from the fluid channel, into one of the intermediate channels.

10. The housing component according to claim 8, wherein between the at least one outer wall and the support elements, there is formed running around the support elements an outer channel, into which the individual intermediate channels open out, and which is designed to conduct the fluid to the at least one outlet opening.

11. A plug connector comprising the housing component according to claim 1 and at least one sealing element adjacent along the longitudinal axis to the plug-side portion of the housing component or arranged in the plug-side portion and mountable externally on the cable.

12. A plug connector assembly comprising the plug connector according to claim 11 and the cable.

13. A housing component for a plug connector, in particular an end cap for a plug connector housing, comprising:

a cable-side axial portion and a plug-side axial portion adjoining the cable-side portion along a longitudinal axis, the cable-side portion having a cable bushing for a cable running along the longitudinal axis; and a cable-side volume for a fluid penetrated between the cable bushing, wherein the cable-side volume in the cable-side portion is smaller than a plug-side volume provided to the fluid in the plug-side portion, with at least one outlet opening being formed in the plug-side portion in order to discharge the fluid from the housing component transversely to the longitudinal axis, wherein the plug-side portion has, at least in some regions, at least one outer wall running around the longitudinal axis in order to delimit, at least in some regions, a cavity, the at least one fluid channel opening out into the cavity.

* * * * *